H. H. DANIELS.
SHUTTER LIFT.
APPLICATION FILED SEPT. 8, 1921.

1,417,595.

Patented May 30, 1922.
2 SHEETS—SHEET 1.

H. H. Daniels,
Inventor.

By C. A. Snow & Co.
Attorneys.

H. H. DANIELS.
SHUTTER LIFT.
APPLICATION FILED SEPT. 8, 1921.
1,417,595.
Patented May 30, 1922.
2 SHEETS—SHEET 2.
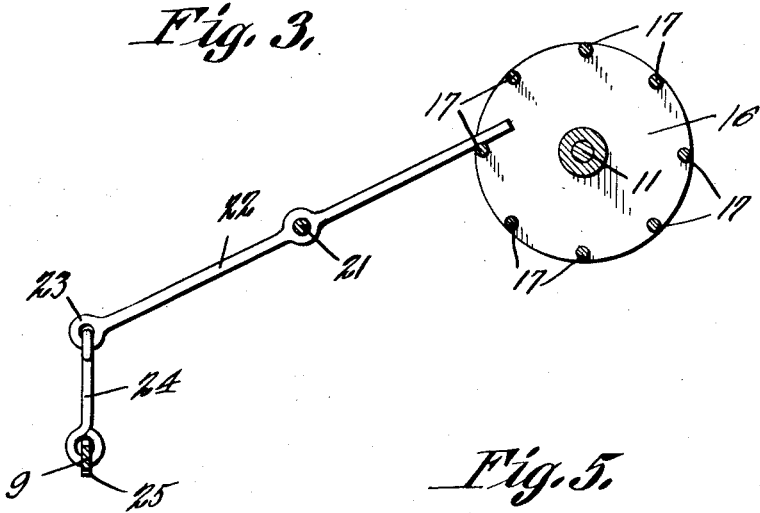
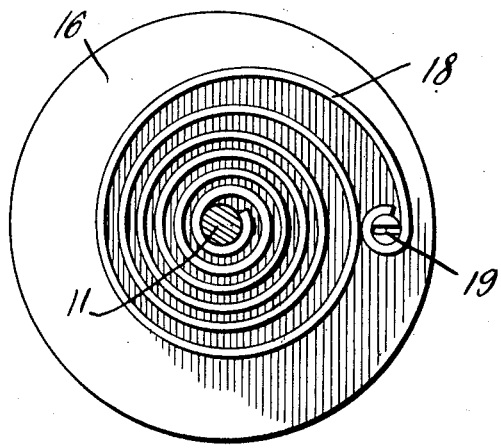
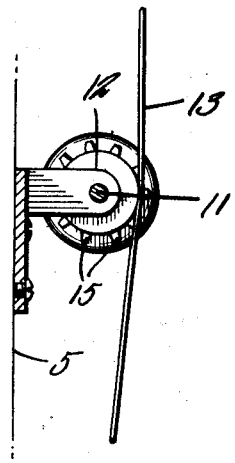

UNITED STATES PATENT OFFICE.

HOMER HOLT DANIELS, OF OSWEGO, KANSAS.

SHUTTER LIFT.

1,417,595.

Specification of Letters Patent. Patented May 30, 1922.

Application filed September 8, 1921. Serial No. 499,247.

*To all whom it may concern:*

Be it known that I, HOMER H. DANIELS, a citizen of the United States, residing at Oswego, in the county of Labette and State of Kansas, have invented a new and useful Shutter Lift, of which the following is a specification.

This invention relates to moving picture apparatus, and more particularly to a device designed to operate in conjunction with safety shutter of a moving picture apparatus to automatically control the same.

The primary object of the invention is to provide novel means controlled by the movement of the film strip over its guiding rollers for operating the safety shutter to cause the same to move to its closed position, when the film strip becomes broken.

Another object of the invention is to provide a device of this character which will cause the shutter to be moved to its open position with the initial movement of the film over its guiding rollers.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 3 is a sectional view taken on line 3—3 of Figure 1.

Figure 4 is a sectional view taken on line 4—4 of Figure 1.

Figure 5 is a detail view disclosing a film as moving over its guiding rollers.

Figure 1:
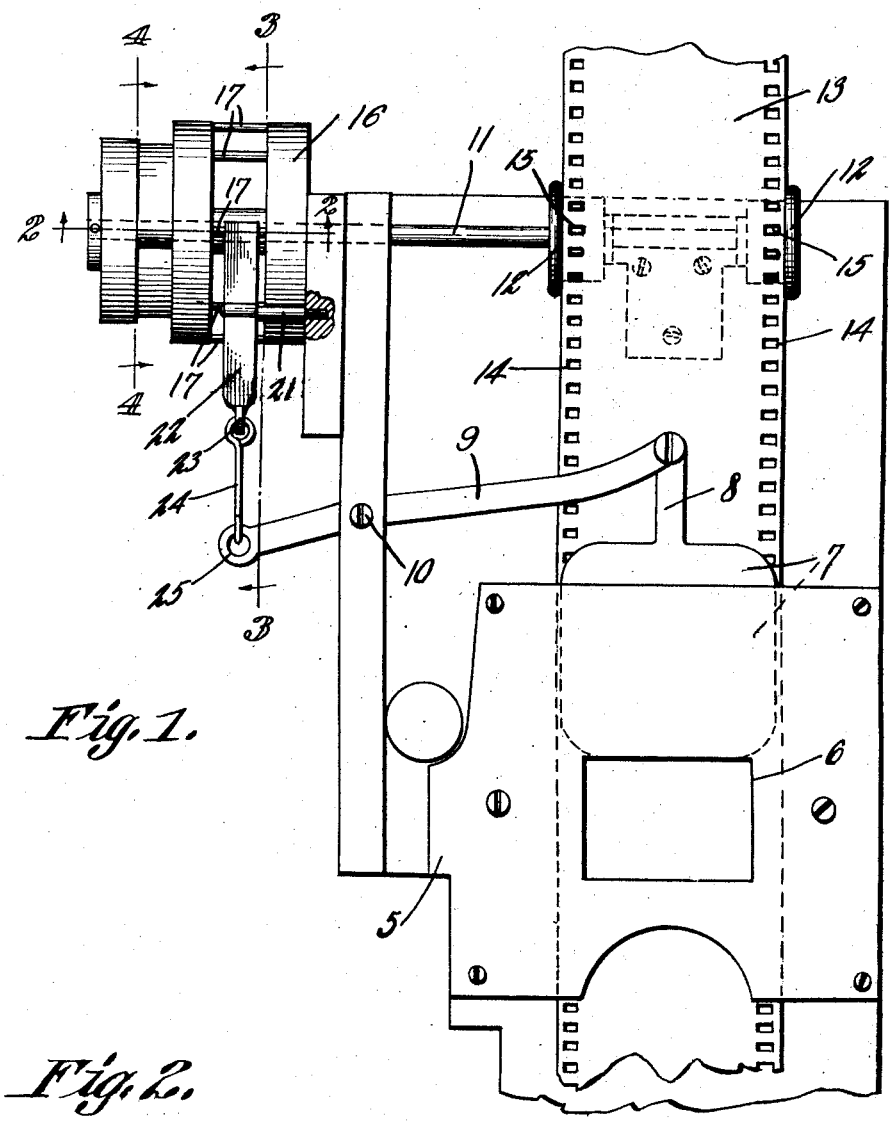
Figure 1 is a fragmental elevational view of a moving picture apparatus disclosing the shutter in an open position.
Figure 2:
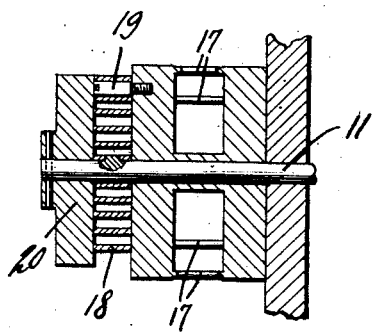
Figure 2 is a sectional view taken on line 2—2 of Figure 1.

Referring to the drawings in detail, the reference character 5 designates the front portion of a moving picture machine which is provided with the opening 6 through which the pictures are projected. At the rear of the opening 6 are provided suitable guideways in which the safety shutter 7 moves, the shutter being of the usual construction, and provided with an upwardly extending arm 8 which has connection with the actuating arm 9 that is pivotally connected to the frame of the machine as by means of the bolt 10 which passes through suitable openings in the frame and arm.

Supported in suitable bearings formed on the frame, is the usual guide roller shaft 11 which supports the guiding rollers 12 over which operates the picture strip 13, the same being of the usual construction and provided with spaced openings, 14 to accommodate the teeth 15 carried by the roller 12. Thus it will be seen that movement of the strip 13 over the guiding roller 12, produces a relative movement of the shaft 11.

The shaft 11 is relatively long, one end thereof extending beyond the side wall of the frame of the machine where the shaft supports the controlling wheel 16 which embodies spaced disks connected by the rods 17 that are disposed in spaced relation with each other, adjacent to the peripheries of the disks. This wheel 16 is free to revolve on the shaft 11 and has connection with the spring 18 as at 19, the opposite end of the spring being secured to the disk 20, as clearly shown by Figure 4 of the drawings, the disk being keyed or otherwise secured to the shaft 11 to revolve therewith.

A stub shaft 21 extends laterally from the frame of the machine and provides a support for the operating arm 22 which has pivotal connection with the shaft 21 intermediate the length of the arm 22, one end of the arm 22 being shown as contacting with the rods 17, as the wheel 16 revolves. One end of the arm 22 is formed into an eye to accommodate the looped end 23 of the link 24 that connects the arms 22 and 9, the link 24 having connection with the arm 9 as through the eye 25 formed at one end thereof.

The operation of the device is as follows:

Assuming that the machine is placed in motion, the film strip 13 moving over the guide roller 12, causes the shaft 11 to revolve, which in turn places the spring 18 under tension. When the spring 18 has become wound, the wheel 16 revolves with the shaft 11. It follows that as the wheel 16 revolves in a clockwise direction, the rods 17 move over the arm 22 moving the opposite end thereof downwardly with the result that the outer end of the arm 9 is also moved downwardly, the inner end or shutter engaging end thereof moves upwardly moving the shutter to an open position to permit the pictures of the picture strip 13 to be projected.

Assuming that the strip 13 should break, the spring 18 immediately revolves the wheel 16 in an opposite direction, the rod 17 contacting with the arm 22 to rock the arm 9 in the opposite direction and move the shutter 7 to a closed position. Thus it will be seen that all danger of the film exploding or becoming ignited from the intense heat of the burner employed in connection with moving picture apparatus, is eliminated.

Having thus described the invention, what is claimed as new is:—

In combination with the guide roller and safety shutter of a moving picture apparatus, a shaft for supporting the roller, a wheel including spaced disks, supported on the shaft, rods having connection with the disks, an operating arm associated with the wheel and adapted to be engaged by the rods to move the arm, an actuating arm having connection with the shutter, means for connecting the operating arm and actuating arm, whereby movement of the wheel produces a relative movement of the arm to open or close the shutter, and spring means for moving the wheel in one direction.

In testimony that I claim the foregoing as my own, I have hereto affixed my signature in the presence of two witnesses.

HOMER HOLT DANIELS.

Witnesses:
L. B. GLASSCOCK,
M. I. TERRILL.